US009792933B2

(12) United States Patent
Koizumi et al.

(10) Patent No.: US 9,792,933 B2
(45) Date of Patent: Oct. 17, 2017

(54) MAGNETIC HEAD, DISK DRIVE WITH THE SAME AND METHOD OF MANUFACTURING MAGNETIC HEAD

(71) Applicant: Kabushiki Kaisha Toshiba, Minato-ku, Tokyo (JP)

(72) Inventors: Gaku Koizumi, Yokohama Kanagawa (JP); Tomoko Taguchi, Kunitachi Tokyo (JP); Katsuhiko Koui, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/976,096

(22) Filed: Dec. 21, 2015

(65) Prior Publication Data
US 2017/0092304 A1 Mar. 30, 2017

(30) Foreign Application Priority Data

Sep. 30, 2015 (JP) .................................. 2015-194438

(51) Int. Cl.
*G11B 5/48* (2006.01)
*G11B 5/31* (2006.01)
*G11B 5/127* (2006.01)
*G11B 5/187* (2006.01)
(Continued)

(52) U.S. Cl.
CPC ............ *G11B 5/315* (2013.01); *G11B 5/1278* (2013.01); *G11B 5/1871* (2013.01); *G11B 5/235* (2013.01); *G11B 5/3133* (2013.01); *G11B 5/3146* (2013.01); *G11B 5/3169* (2013.01);
(Continued)

(58) Field of Classification Search
CPC ..... G11B 5/315; G11B 5/1278; G11B 5/1871; G11B 5/235; G11B 5/3133; G11B 5/3146; G11B 5/3169; G11B 5/3173; G11B 5/4853; G11B 2005/0024
See application file for complete search history.

(56) References Cited

U.S. PATENT DOCUMENTS 5,068,759 A * 11/1991 Matsuzaki ........... G11B 5/3106
360/234.5
5,293,288 A * 3/1994 Ishikawa .............. G11B 5/3103
360/234.5
(Continued)

FOREIGN PATENT DOCUMENTS

JP 2012-236947 A 12/2012
JP 2013-242934 A 12/2013

*Primary Examiner* — Brian Miller
(74) *Attorney, Agent, or Firm* — White & Case LLP

(57) ABSTRACT

According to one embodiment, a magnetic head includes an air bearing surface, a first surface on which contact pads connected to elements are provided, a pair of second surfaces provided respectively with a connection terminal connected to the contact pad, a main pole with a distal end portion extending to the air bearing surface, a write shield opposing the distal end portion of the main pole with a write gap therebetween, and a high-frequency oscillator provided between the main pole and the write shield within the write gap and electrically connected to the main pole and the write shield. The high-frequency oscillator includes a spin injection layer and an oscillation layer, and at least the oscillation layer is recessed in a direction away from the air bearing surface.

6 Claims, 12 Drawing Sheets

(51) Int. Cl.
*G11B 5/235* (2006.01)
*G11B 5/00* (2006.01)

(52) U.S. Cl.
CPC .......... *G11B 5/3173* (2013.01); *G11B 5/4853* (2013.01); *G11B 2005/0024* (2013.01)

(56) References Cited

U.S. PATENT DOCUMENTS

| | | | | |
|---|---|---|---|---|
| 7,698,806 B2* | 4/2010 | Bonin | ............ | G11B 5/6005 |
| | | | | 156/268 |
| 7,929,248 B2* | 4/2011 | Zhu | ............ | G11B 5/4853 |
| | | | | 360/234.5 |
| 8,059,496 B1 | 11/2011 | Zhou et al. | | |
| 8,154,825 B2* | 4/2012 | Takashita | ............ | G11B 5/02 |
| | | | | 360/125.3 |
| 8,159,781 B2* | 4/2012 | Taguchi | ............ | G11B 5/3133 |
| | | | | 360/125.12 |
| 8,164,858 B1* | 4/2012 | Moravec | ............ | G11B 5/4853 |
| | | | | 360/234.5 |
| 8,295,011 B2* | 10/2012 | Chou | ............ | G11B 5/105 |
| | | | | 360/234.5 |
| 8,755,153 B2* | 6/2014 | Kudo | ............ | G11B 5/3903 |
| | | | | 360/321 |
| 8,804,284 B1* | 8/2014 | Ohtake | ............ | G11B 5/1278 |
| | | | | 360/125.3 |
| 8,902,547 B1* | 12/2014 | Zhong | ............ | G11B 5/4853 |
| | | | | 360/234.5 |
| 8,995,091 B2* | 3/2015 | Inoue | ............ | G11B 5/3163 |
| | | | | 360/123.1 |
| 9,142,228 B2* | 9/2015 | Fujita | ............ | G11B 5/23 |
| 9,202,528 B2* | 12/2015 | Furukawa | ............ | G11B 33/1433 |
| 9,230,571 B1* | 1/2016 | Chen | ............ | G11B 5/314 |
| 2003/0161069 A1* | 8/2003 | Hipwell, Jr. | ............ | G11B 5/4853 |
| | | | | 360/234.5 |
| 2009/0080106 A1 | 3/2009 | Shimizu et al. | | |
| 2011/0205655 A1* | 8/2011 | Shimizu | ............ | G11B 5/02 |
| | | | | 360/39 |
| 2011/0216435 A1* | 9/2011 | Shiimoto | ............ | G11B 5/02 |
| | | | | 360/59 |
| 2013/0215530 A1* | 8/2013 | Igarashi | ............ | G11B 5/1278 |
| | | | | 360/59 |
| 2014/0118861 A1 | 5/2014 | Funayama | | |
| 2015/0092292 A1* | 4/2015 | Furukawa | ............ | G11B 33/1433 |
| | | | | 360/59 |

* cited by examiner

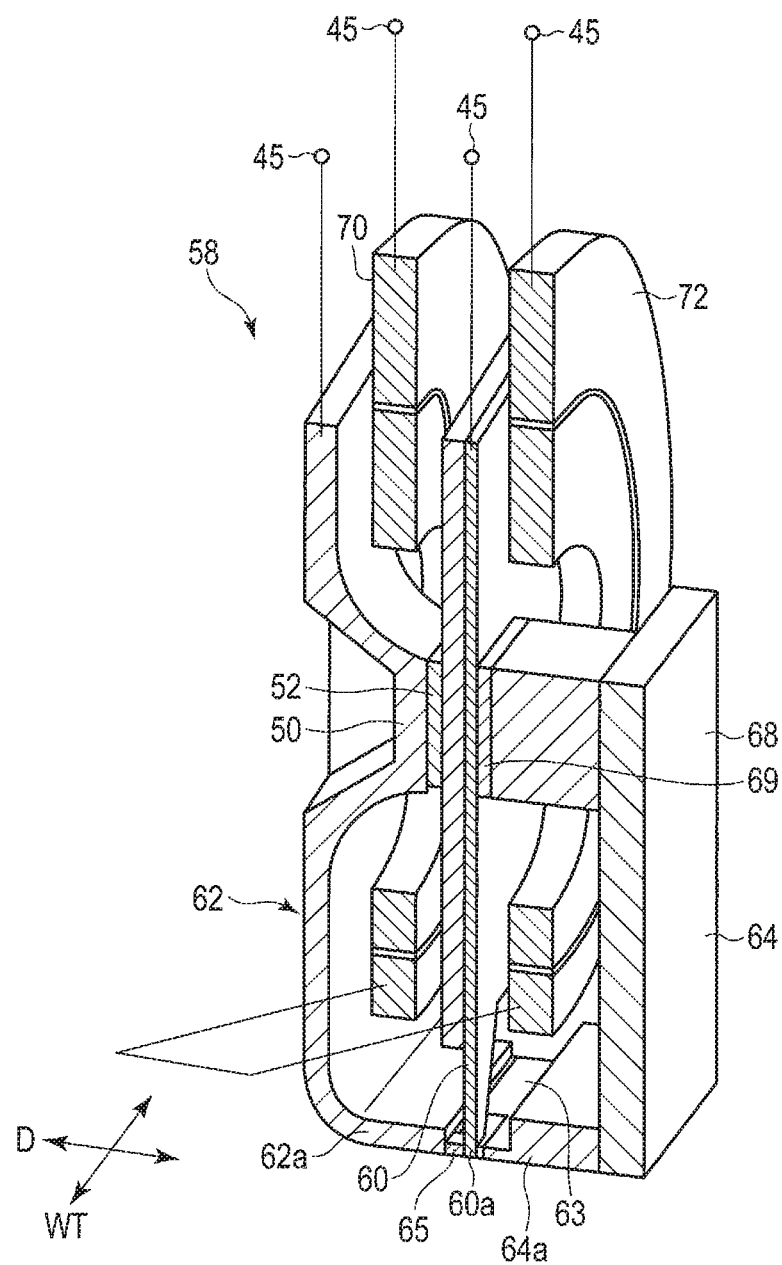
F I G. 5

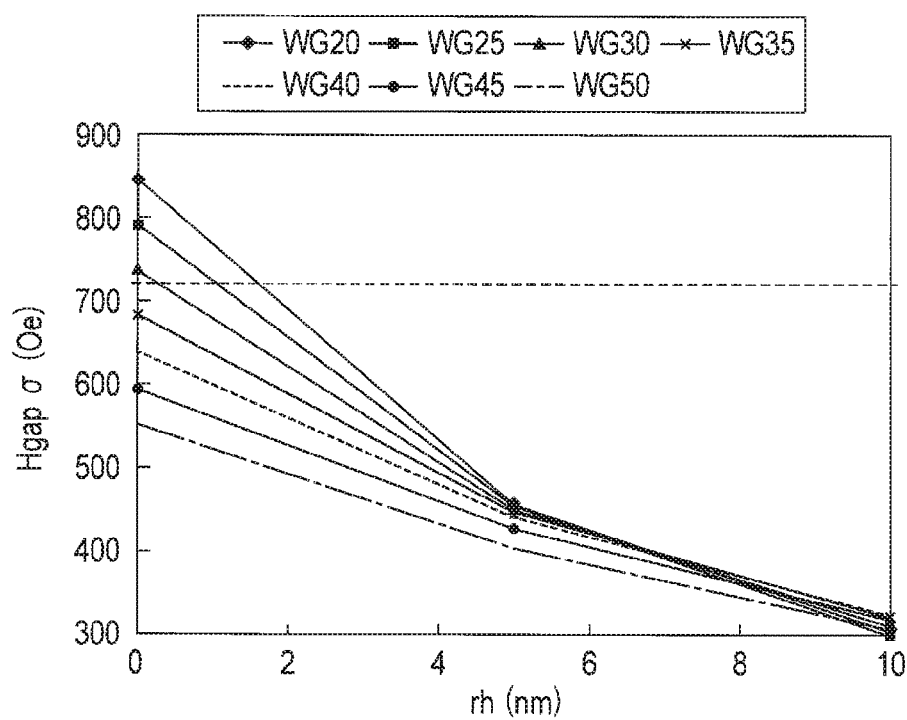
F I G. 9
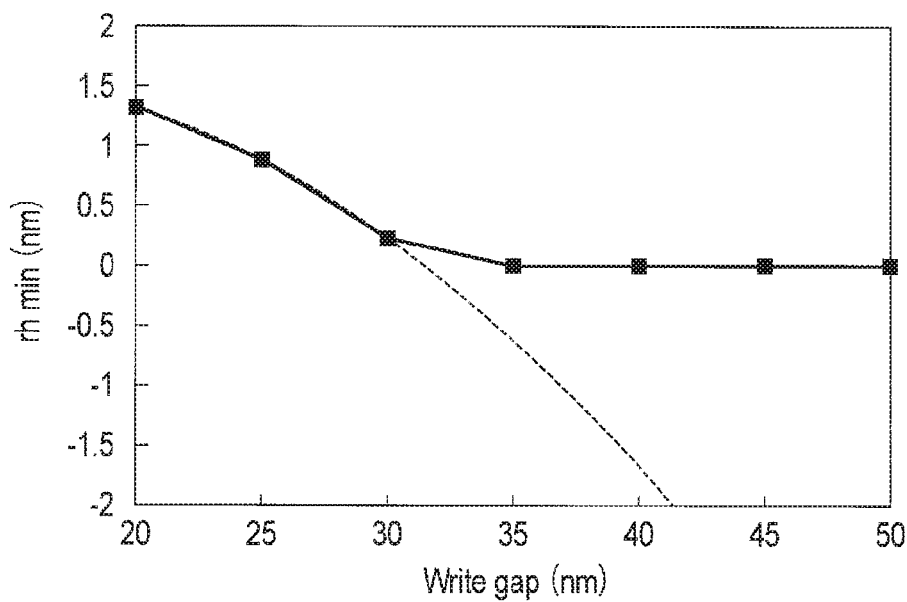
F I G. 10

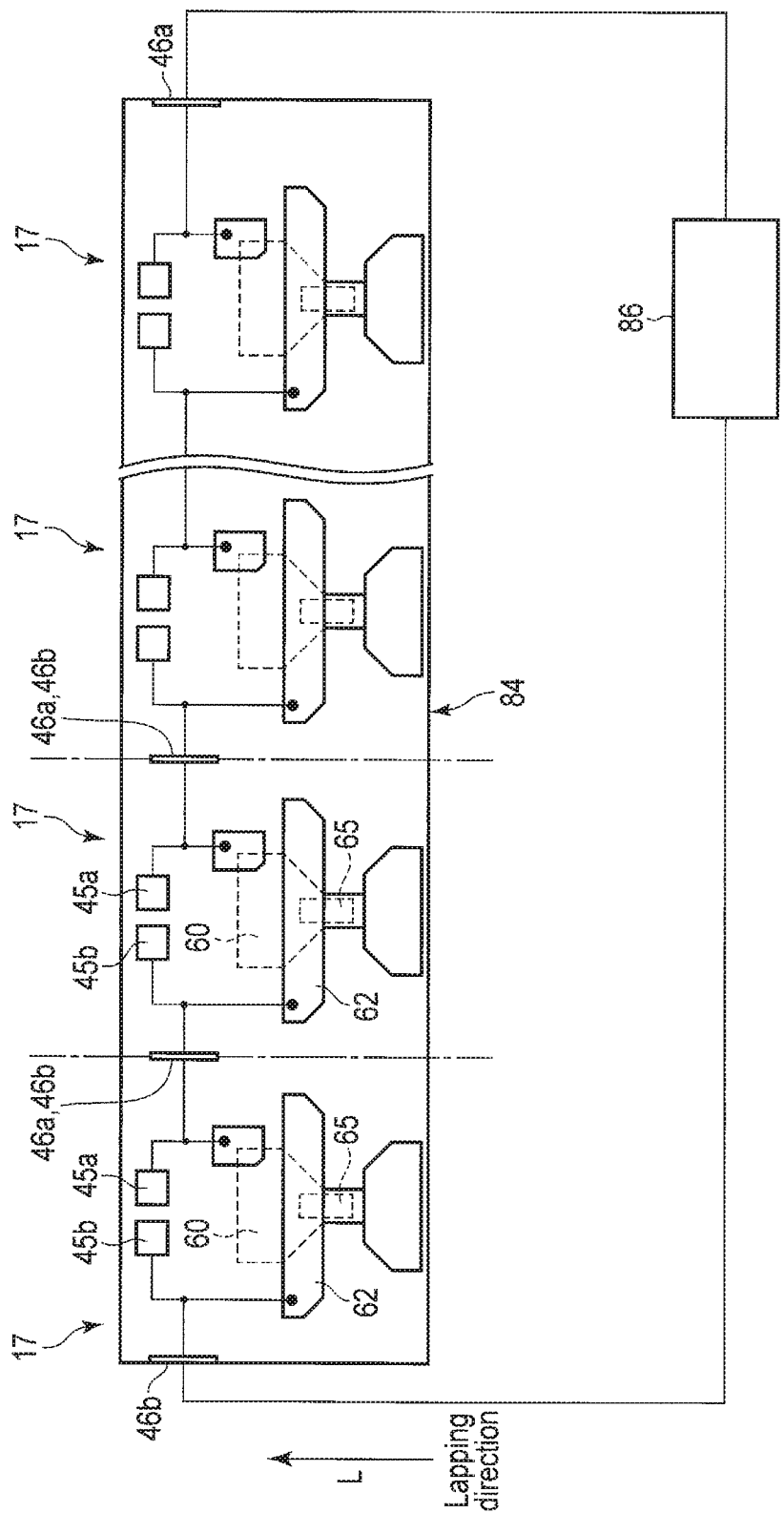
F I G. 15

MAGNETIC HEAD, DISK DRIVE WITH THE SAME AND METHOD OF MANUFACTURING MAGNETIC HEAD

CROSS-REFERENCE TO RELATED APPLICATIONS

This application is based upon and claims the benefit of priority from Japanese Patent Application No. 2015-194438, filed Sep. 30, 2015, the entire contents of which are incorporated herein by reference.

FIELD

Embodiments described herein relate generally to a magnetic head comprising a high-frequency assist element, a disk drive comprising the magnetic head, and a method of manufacturing the magnetic head.

BACKGROUND

In recent years, a disk drive, such as a magnetic disk drive using a magnetic head for perpendicular magnetic recording has been proposed in order to achieve higher recording density, larger capacity, and miniaturization. In such a magnetic head, the recording head comprises a main pole configured to produce a perpendicular magnetic field and a write shield magnetic pole arranged on a trailing side of the main pole while interposing a write gap therebetween. Further, a recording head of a high-frequency assist recording mode has been proposed, in which a high-frequency assist element, for example, a spin torque oscillator, is provided in the write gap between the write shield magnetic pole and the main pole, and a high-frequency magnetic field is applied to the magnetic recording layer of a magnetic disk by the spin torque oscillator.

The above-described spin torque oscillator comprises a spin injection layer and an oscillation layer, which are arranged in the write gap. Usually, in a write gap, the gap magnetic field in a region (depth-side position) perpendicularly away from an air bearing surface (ABS) is stronger rather than that near the ABS. In other words, the magnetic field is non-uniform in the height direction of the write gap (in the depth direction from the ABS). Consequently, the magnetization of the oscillation layer and the spin injection layer is easily directed in the head traveling direction in the depth-side position away from the ABS, but on the ABS side, it becomes easily unstable. That is, it becomes difficult to rotate the magnetization of the oscillation layer uniformly. As a result, the spin torque oscillator cannot be made to oscillate excellently, degrading the oscillation characteristics.

BRIEF DESCRIPTION OF THE DRAWINGS

FIG. 5 is a perspective view schematically showing a recording head of the magnetic head.

FIG. 9 is a diagram showing the relationship between a retreat amount (interval or depth of recess) rh of the STO and the distribution value, δ, of the gap magnetic-field when the write gap length of the magnetic head is 20 to 50 nm.

FIG. 10 is a diagram showing the relationship between the write gap length and the minimum retreat amount rh (min) of the magnetic head.

FIG. 15 is a diagram briefly showing an internal structure of the row bar.

DETAILED DESCRIPTION

Various embodiments will be described hereinafter with reference to the accompanying drawings. In general, according to one embodiment, a magnetic head comprises an air bearing surface; a first surface on which contact pads including a first contact pad and a second contact pad connected to elements are provided; a pair of second surfaces provided respectively with a pair of connection terminals connected respectively to the first and second contact pads to supply electricity to the elements; a main pole configured to produce a magnetic field for recording and comprising a distal end portion extending to the air bearing surface; a write shield opposing the distal end portion of the main pole with a write gap therebetween; and a high-frequency oscillator provided between the main pole and the write shield within the write gap and electrically connected to the main pole and the write shield, the high-frequency oscillator comprising a spin injection layer and an oscillation layer stacked one on another, and at least the oscillation layer being recessed in a direction away from the air bearing surface with respect to the main pole and the write shield.

Note that the disclosure is presented for the sake of exemplification, and any modification and variation conceived within the scope and spirit of the invention by a person having ordinary skill in the art are naturally encompassed in the scope of invention of the present application. Furthermore, the width, thickness, shape, and the like of each element are depicted schematically in the figures as compared to actual embodiments for the sake of simpler explanation, and they do not limit the interpretation of the invention of the present application. Furthermore, in the description and figures of the present application, structural elements having the same or similar functions will be referred to by the same reference numbers and detailed explanations of them that are considered redundant may be omitted.

First Embodiment

Figure 1:
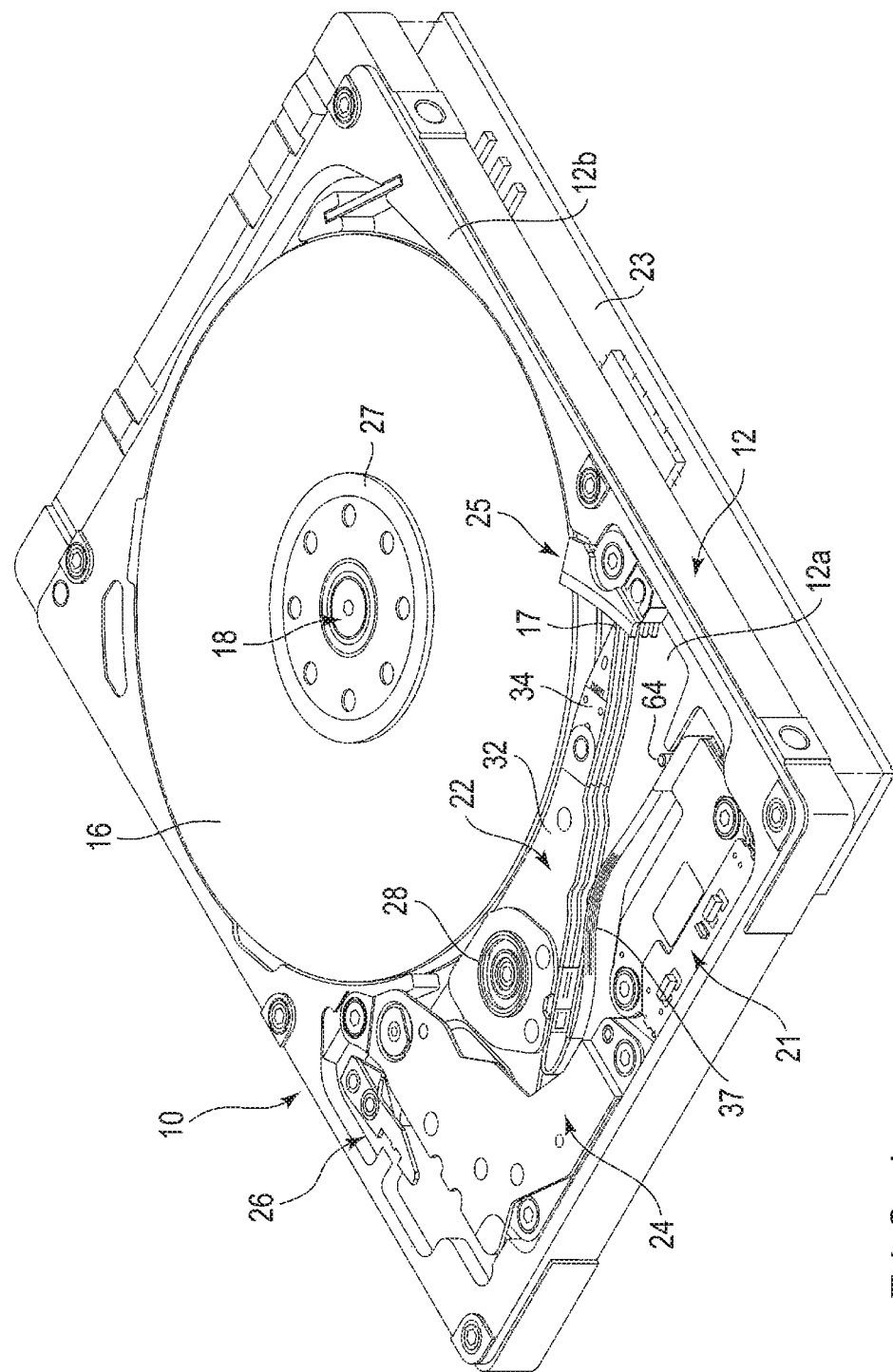
FIG. 1 is a perspective view showing a hard disk drive (HDD) according to a first embodiment.
Figure 2:
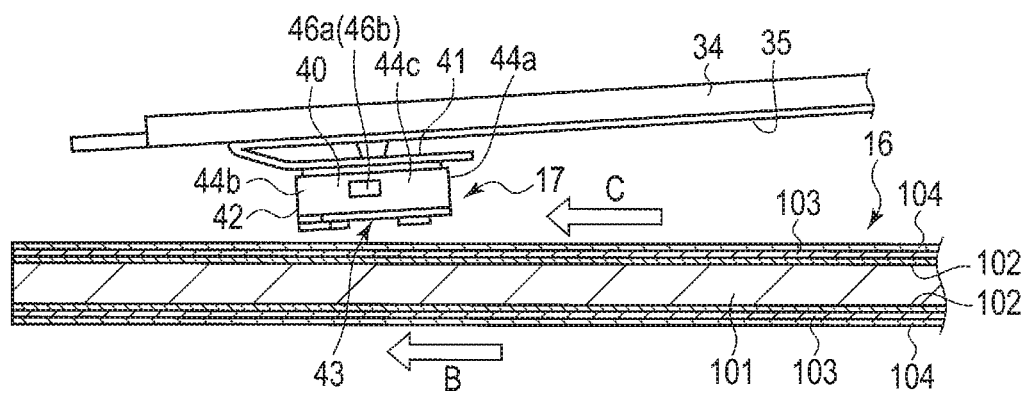
FIG. 2 is a side view showing a magnetic head and a suspension in the HDD.

FIG. 1 shows an internal structure of a hard disk drive (HDD) according to a first embodiment as a disk drive, where a top cover thereof is removed, and FIG. 2 shows a magnetic head in a flying state. As shown in FIG. 1, the HDD comprises a housing 10. The housing 10 comprises a base 12 in a rectangle box shape whose top surface is opened, and a top cover (not shown) fixed to the base 12 with a plurality of screws to close the upper end opening of the base 12. The base 12 comprises a rectangular bottom wall 12a and sidewalls 12b standing along the side edges of the bottom wall 12a.

The housing 10 accommodates, for example, two magnetic disks 16 as recording media and a spindle motor 18 as an actuator, configured to support and rotate the magnetic disks 16. Each of the magnetic disks 16 includes magnetic recording layers on upper and lower surfaces thereof. The magnetic disks 16 are coaxially fitted to a hub (not shown) of the spindle motor 18 and clamped with a clamp spring 27 to be fixed to the hub. With this structure, the magnetic disks 16 are supported in the state where they are parallel to the bottom wall 12a of the base 12. The magnetic disks 16 are rotated at predetermined speed by the spindle motor 18.

In the housing 10 are provided a plurality of magnetic heads 17 configured to record and read data on/from the magnetic disks 16, and a carriage assembly 22 configured to movably support the magnetic heads 17 with relative to the magnetic disks 16. Further, the housing 10 accommodates a voice coil motor (VCM) 24 configured to rotate and position the carriage assembly 22, a ramp load mechanism 25 configured to hold the magnetic heads 17 in an unload position spaced apart from the respective magnetic disk 16 when the magnetic heads 17 move to the outermost circumference of the magnetic disk 17, a latch mechanism 26 configured to hold the carriage assembly 22 in an evacuation position when an impact or the like acts on the HDD and a flexible printed circuit board (FPC) unit 21 on which electronic components including a conversion connector and the like are mounted.

To an external surface of the base 12, a control circuit board (controller) 23 is fixed by screws and located to oppose a bottom wall 12a. The control circuit board 23 is configured to control the operation of the spindle motor 18, and also control the operation of the VCM 24 and the magnetic heads 17 through the FPC unit 21.

The carriage assembly 22 comprises a unit bearing 28 mounted on the bottom wall 12a of the base 12, a plurality of arms 32 extending from the unit bearing 28 and elastically deformable slender plate-shaped suspensions 34. The suspensions 34 are fixed by their proximal ends to the distal ends of the arms 32, respectively, by spot welding or adhesion, to extend from the arms 32. The suspension 34 may also be formed integrally with the corresponding arm 32. Each magnetic head 17 is supported on the extending end of each suspension 34. The suspensions 34 and the magnetic heads 17 face each other while interposing the respective magnetic disks 16 between each pair.

As shown in FIG. 2, each magnetic head 17 is constituted as a flying type head and comprises a slider 40 having substantially a rectangular parallelepiped shape and a head section 42 for recording/reading provided at an outflow end (trailing-side end) of the slider 40. The magnetic head 17 is fixed to a gimbal portion 41 provided at the distal end portion of the respective suspension 34. The magnetic head 17 is electrically connected to the FPC unit 21 through a wiring component (trace) 35 affixed to the respective suspension 34, the respective arm 32 and a relay FPC 37.

Figure 3:
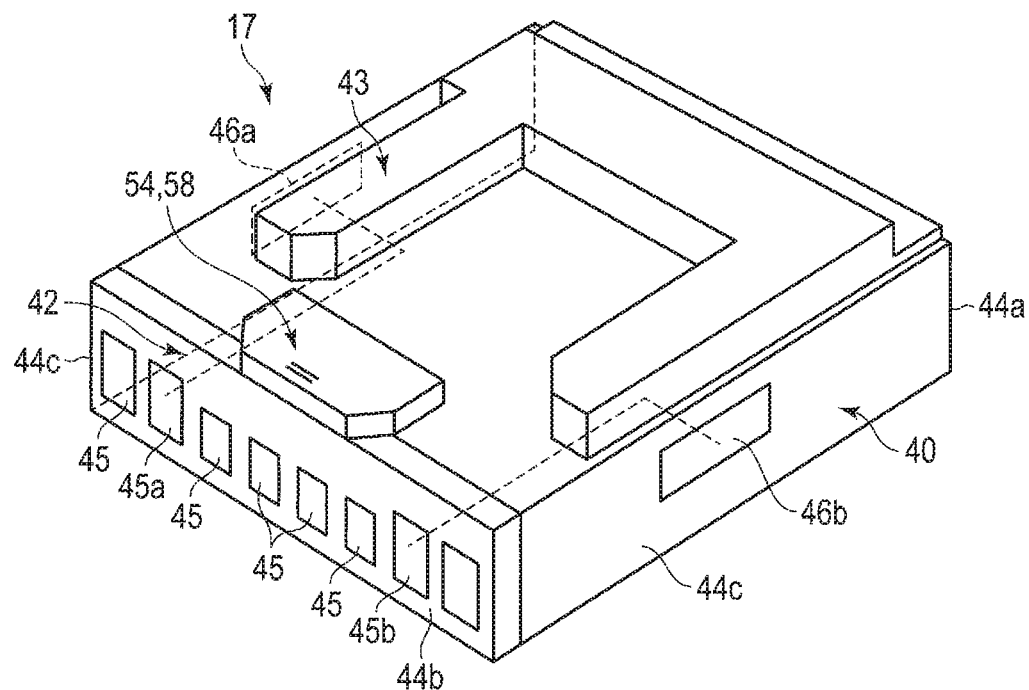
FIG. 3 is a perspective view showing the magnetic head from an air bearing surface (ABS) side.

As shown in FIGS. 2 and 3, the slider 40 is formed by a sintered body of, for example, alumina and titanium carbide (AlTiC) and the head portion 42 is formed by stacking thin films. The slider 40 comprises a rectangular air bearing surface (ABS) 43 configured to oppose the surface of the respective magnetic disk 16, a leading-side end surface 44a, a trailing-side end surface (first surface) 44b on an opposite side and a pair of opposing side surfaces (second surfaces) 44c, which are formed to stand along the side edges of the ABS 43. The ABS 43 includes a leading step, a trailing step, side steps, a negative pressure cavity, etc. The slider 40 flies above the surface of the magnetic disk 16 by a predetermined distance by an air flow C generated between the disk surface and the ABS 43 by the rotation of the magnetic disk 16. The direction of the air flow C matches a rotation direction B of the magnetic disk 16.

The leading-side end surface 44a is located on the inflow side of the air flow C, and the trailing-side end surface 44b is located on the outflow side of the air flow C. A plurality of contact pads 45 (45a, 45b) are provided on the trailing-side end surface 44b and aligned in a longitudinal direction of the end surface 44b. The contact pads 45 are electrically connected to a magnetic pole, a recording coil, a heater, etc., described later. Further, a pair of connection terminals 46a and 46b are exposed on the pair of side surfaces 44c, respectively. The pair of connection terminals 46a and 46b are electrically connected to the magnetic pole and a high-frequency oscillator, described later, and further electrically connected to some of the contact pads 45 (45a, 45b) inside the magnetic head 17.

Figure 4:
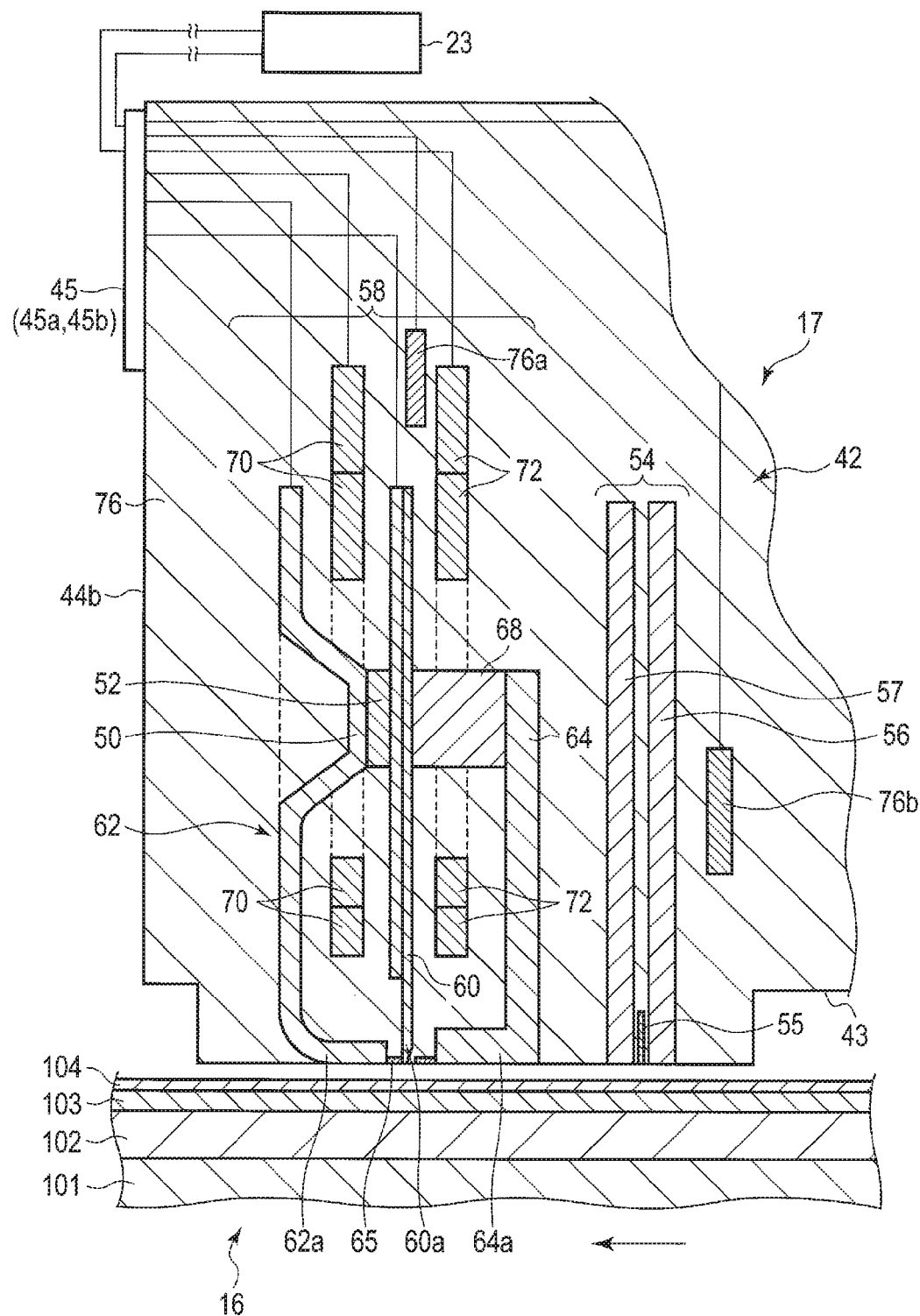
FIG. 4 is an enlarged cross-sectional view of a head portion of the magnetic head.
Figure 6:
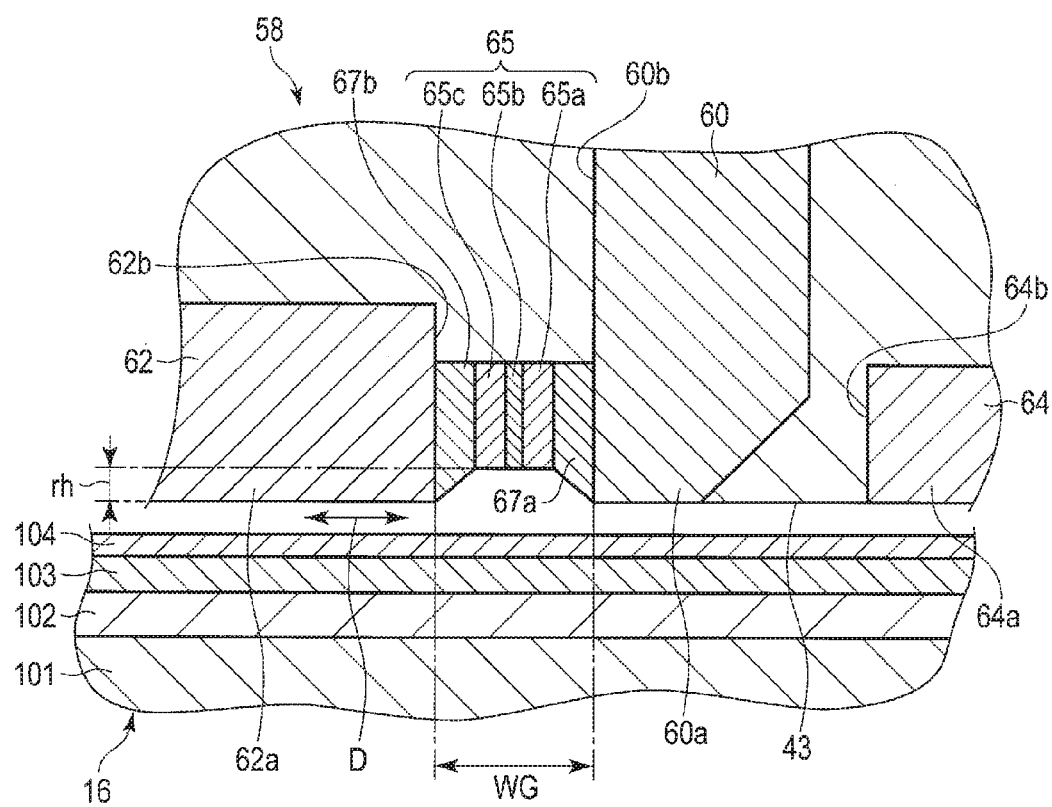
FIG. 6 is an enlarged cross-sectional view of an end portion of the recording head on the ABS side taken along the track center.

Next, the structures of the magnetic disk 16 and the magnetic head 17 will be described in detail. FIG. 4 is an enlarged cross sectional view of a head portion of a magnetic head and a magnetic disk. FIG. 5 is a perspective view of a cross section of the recording head element cut in the track center. FIG. 6 is an enlarged sectional view of a distal end portion (ABS-side end) of the recording head.

As shown in FIG. 4, the magnetic disk 16 comprises a substrate 101 of a nonmagnetic material formed into a disk shape having, for example, a diameter of about 2.5 inches (63.5 mm). On each surface of the substrate 101, a soft magnetic layer 102 made of a material exhibiting soft magnetic properties as a base layer, a recording layer 103 having magnetic anisotropy in a direction perpendicular to the disk surface as an upper layer on the base layer, and a protective film layer 104 as an upper layer thereof are stacked in this order.

The head portion 42 comprises a read head 54 and a recording head (magnetic recording head) 58 which are formed by a thin-film process in the vicinity of the trailing-side end surface 44b of the slider 40, and thus is formed as a separate magnetic head. The read head 54 and the recording head 58 are covered by a protective insulating film 76 except for the portion exposed to the ABS 43 of the slider 40. The protective insulating film 76 constitutes the outline of the head portion 42.

The read head 54 comprises a magnetic film 55 exhibiting a magneto-resistive effect, shield films 56 and 57 disposed respectively on the trailing side and the leading side of the magnetic film 55 while interposing the magnetic film 55 therebetween. Lower ends of the magnetic film 55 and the shield films 56 and 57 are exposed to the ABS 43 of the slider 40.

The recording head 58 is provided on the side of the trailing-side end surface 44b of the slider 40 with respect to the read head 54. As shown in FIGS. 4 and 5, the recording head 58 comprises a main pole 60 of a high-saturation-magnetization material generating a recording magnetic field in a direction perpendicular to the surface (to the recording layer) of the magnetic disk 16, a trailing shield (write shield, first shield) 62 and a leading shield (second shield) 64. The main pole 60 and the trailing shield 62 constitute a first magnetic core forming a magnetic path, whereas the main pole 60 and the leading shield 64 constitute a second magnetic core forming a magnetic path. The recording head 58 comprises a first coil (record coil) 70 wound around the first magnetic core, and a second coil (record coil) 72 wound around the second magnetic core.

As shown in FIG. 6, the main pole 60 extends substantially perpendicularly to the ABS 43. A distal end portion 60a of the main pole 60 on a magnetic disk 16 side is tapered toward the disk side. The distal end portion 60a of the main pole 60 has, for example, a trapezoidal shape in cross section. The distal end surface of the main pole 60 is exposed to the ABS 43 of the slider 40. The width of a trailing side end surface 60b of the distal end portion 60a substantially corresponds to that of the tracks on the magnetic disk 16.

As shown in FIGS. 4 and 5, the trailing shield 62, formed of a soft magnetic material, is disposed on the trailing-side of the main pole 60 so as to close the magnetic path efficiently via the soft magnetic layer 102 of the magnetic disk 16 immediately beneath the main pole 60. The trailing shield 62 is formed into substantially an L-shape, and includes a first connection portion 50 connected to the main pole 60. The first connection portion 50 is magnetically connected to an upper portion of the main pole 60, that is, a portion located away from the ABS 43 of the main pole 60 through a non-conductive material 52.

As shown in FIGS. 4 to 6, a distal end portion 62a of the trailing shield 62 is formed into a slender rectangular shape. A distal end surface of the trailing shield 62 is exposed to the ABS 43. A leading-side end surface 62b of the distal end portion 62a extends in the width direction of the track of the magnetic disk 16 and also substantially perpendicularly to the ABS 43. The leading-side end surface 62b opposes in parallel to the trailing-side end surface 60b of the main pole 60 via a write gap WG.

The STO 65, which functions as a high-frequency oscillator, is provided between the distal end portion 60a of the main pole 60 and the distal end portion 62a of the trailing shield 62 in the write gap WG. The STO 65 comprises a spin injection layer 65a, an interlayer (nonmagnetic conductive layer) 65b and an oscillation layer (a field generation layer) 65c, which are stacked in the order from the main pole 60 side to the trailing shield 62 side, that is, in the order in a traveling direction D of the magnetic head 17. The spin injection layer 65a is joined to the trailing-side end surface 60b of the main pole 60 via a nonmagnetic conductive layer (underlying layer) 67a. The oscillation layer 65c is joined to the leading-side end surface 62b of the trailing shield 62 via a nonmagnetic conductive layer (cap layer) 67b. Note that the order of stacking of the spin injection layer 65a, the interlayer 65b and the oscillation layer 65c may be reversed from that described above, that is, in the order from the trailing shield 62 side to the main pole 60 side.

The spin injection layer 65a, the interlayer 65b and the oscillation layer 65c each include a stacking surface or a film surface expanding in a direction intersecting the ABS 43, for example, the direction intersecting normally therewith. At least a lower end surface of the oscillation layer 65c, or in this embodiment, a lower end surface of the entire STO 65 including the spin injection layer 65a, the interlayer 65b and the oscillation layer 65c is recessed by an interval (depth of the recess, or retreat amount) rh in a direction away from the ABS 43, for example, a direction perpendicular to the ABS 43, and toward the rear (depth) side. That is, the lower end surface of the STO 65 is recessed from the ABS 43 by the interval (depth of the recess) rh with respect to the lower ends of the main pole 60 and the write shield 62.

Note that the lower end surface of the nonmagnetic conductive layer 67a extends to be inclined from the distal end of the main pole 60 to the lower end of the spin injection layer 65a. Similarly, the lower end surface of the nonmagnetic conductive layer 67b extends to be inclined from the distal end of the trailing shield 62 to the lower end of the oscillation layer 65c. Further, the width of the STO 65 in the track-width direction WT (see FIG. 5) is set to be substantially equal to the width of one track of the magnetic disk 16.

The lower end surface of the STO 65 is not limited to planer, but may be formed into an arcuate which it is convex upward.

As shown in FIGS. 4 and 5, the main pole 60 and the trailing shield 62 are connected to the contact pads 45 by wiring interconnects, respectively and are further connected to the control circuit board 23 through the trace 35. A current circuit is constituted so that an STO current is allowed to pass in series through the main pole 60, the STO 65 and the trailing shield 62 from the control circuit board 23.

The first coil 70 of the recording head 58 is wound around, for example, the first connection portion 50 in the first magnetic core. When writing a signal to the magnetic disk 16, a recording current is allowed to pass the first coil 70, and thus the first coil 70 excites the main pole 60 to generate a magnetic flux therein.

As shown in FIGS. 4 and 5, the leading shield 64, formed of a soft magnetic material, opposes the main pole 60 on the leading side thereof. The leading shield 64 is formed into substantially an L-shape, and a distal end portion 64a on the magnetic disk 16 side is formed into a slender rectangular shape. A distal end surface (lower end surface) of the distal end portion 64a is exposed to the ABS 43 of the slider 40. A trailing-side end surface 64b (see FIG. 6) of the distal end portion 64a extends in the width direction of the track of the magnetic disk 16. This trailing-side end surface 64b opposes a leading-side end surface of the main pole 60 with a gap therebetween. In the gap, a protective insulating film is located as a nonmagnetic material, as described later.

The leading shield 64 comprises a second connection portion 68 joined to the main pole 60 at a position away from the magnetic disk 16. The second connection portion 68 is formed of, for example, a soft magnetic material and forms a magnetic circuit together with the main pole 60 and the leading shield 64. The second coil 72 of the recording head 58 is arranged to coil around a magnetic circuit (second magnetic core) including the main pole 60 and the leading shield 64, and it applies a magnetic field to this magnetic circuit. The second coil 72 is wound around, for example, the second connection portion 68 in the second magnetic core. Note that a non-conductive material or a nonmagnetic material may be inserted to a part of the second connection portion 68.

The second coil 72 is wound in a direction opposite to that of the first coil 70. The first coil 70 and the second coil 72 are connected to the contact pads 45 through wiring interconnects, respectively and further connected to the control circuit board 23 through the traces 35. The current supplied to the first coil 70 and the second coil 72 is controlled by the control circuit board 23. Note that the second coil 72 may be connected in series with the first coil 70. Further, the first coil 70 and the second coil 72 may be separately controlled in terms of current supply.

As shown in FIG. 4, the magnetic head 17 further comprises a first heater 76a and a second heater 76b. The first heater 76a is provided near the recording head 58, for example, between the first recording coil 70 and the second record coil 72 and near the main pole 60. The second heater 76b is provided near the read head 54. The first heater 76a and the second heater 76b are connected to the contact pads 45 through wiring interconnects, respectively and further connected to the control circuit board 23 through the trace 35.

The current supplied to the first heater 76a and the second heater 76b is controlled by the control circuit board 23. The first heater 76a produces heat when current is supplied thereto and heats a part of the recording head 58. Thus, the part of the recording head 58 thermally expands, projecting the distal end portion of the recording head 58 from the ABS 43 towards the surface of the magnetic disk 16. The second heater 76b produces heat when current is supplied thereto and heats a part of the read head 54. Thus, the part of the read head 54 thermally expands, projecting the distal end portion of the read head 54 from the ABS 43 towards the surface of the magnetic disk 16.

According to the HDD having the structure described above, the carriage assembly 22 is rotated by driving the VCM 24, and the magnetic head 17 is moved above a desired track of the magnetic disk 16 to be positioned there. When the HDD is in operation, the ABS 43 of the magnetic head 17 opposes the disk surface while maintaining a gap. In this state, recorded data is read by the read head 54 from the magnetic disk 16 or data is written by the recording head 58 to the disk.

Upon writing data, as shown in FIG. 4, a direct current is supplied to the main pole 60, the STO 65 and the trailing shield 62 from the control circuit board 23 to produce a high-frequency magnetic field from the STO 65, and the high-frequency magnetic field is applied to the magnetic recording layer 103 of the magnetic disk 16. Further, an alternating current is allowed to pass the first and the second coils 70 and 72 to energize the main pole 60, and thus a perpendicular magnetic field for recording is applied to the magnetic recording layer 103 of the magnetic disk 16 immediately beneath the main pole 60. In this manner, data is recorded on the magnetic recording layer 103 by a desired track width. By superimposing a high-frequency magnetic field on a magnetic field for recording, the flux reversal of the magnetic recording layer 103 is promoted, enabling magnetic recording of high magnetic anisotropic energy. By supplying current from the main pole 60 to the trailing shield 62, turbulence in a magnetic domain in the main pole 60 can be straightened, making it possible to guide an efficient magnetic path. Thus, the magnetic field produced from the distal end of the main pole 60 can be intensified.

Usually, in the write gap WG, the gap magnetic field in a position (rear-side position) away from the ABS 43 in a perpendicular direction is stronger rather than that in a position near the ABS. Therefore, in the magnetization of the STO 65, excellent magnetization rotation with a uniform magnetization direction can be achieved out usually in the rear-side position (position away from the ABS) rather than in the end on the ABS 43 side. For this reason, reflection from the magnetization of the STO occurs in the rear side of the ABS of the spin injection layer, thereby causing the magnetization in the spin injection layer to start fluctuating.

In order to avoid this, according to this embodiment, the spin injection layer 65a and the oscillation layer 65c of the STO 65 are shifted to the rear side from the ABS 43 with respect to the main pole 60 and the trailing shield 62. That is, the lower end surfaces of the spin injection layer 65a and the oscillation layer 65c are located away from the ABS 43 by the interval (depth of the recess) rh. With this structure, the following advantage can be obtained.

Figure 7:
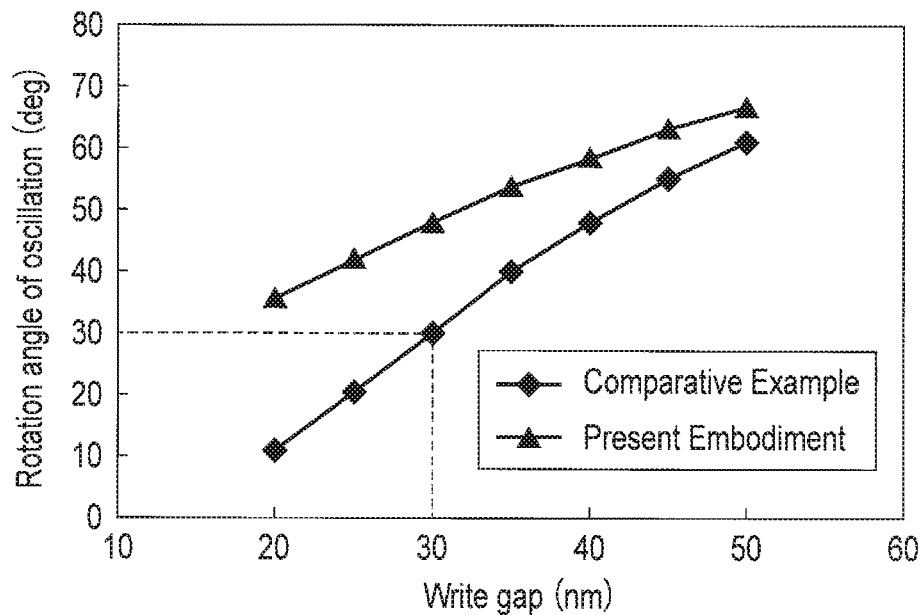
FIG. 7 is a diagram showing the relationship between the length of a write gap and the rotation angle of oscillation of a spin-torque oscillator (STO) regarding the magnetic head of this embodiment and a magnetic head according to a comparative example.

FIG. 7 shows the relationship between the length of the write gap WG and the rotation angle of oscillation of the STO with the magnetic head of this embodiment and a magnetic head according to a comparative example in comparison. Note that in the magnetic head of the comparative example, the lower end surface of the STO is flush with the distal end surface of the main pole and the ABS.

As shown in FIG. 7, as the write gap length is shorter, the rotation angle of oscillation of the STO 65 is decreased. In the comparative example, if the write gap length is 30 nm or less, the rotation angle of oscillation of the STO becomes less than 30 degrees. It is known that if the rotation angle of oscillation is less than 30 degrees, the high-frequency magnetic field from the STO 65 reduces to less than a half as compared to the time of an ideal large oscillation.

However, the magnetic head of this embodiment, the STO 65 oscillates without lowering the rotation angle of oscillation to less than 30 degrees even in a region where the write gap WG is 30 nm or less. Note that the interval (depth of the recess) rh between the STO 65 and the ABS 43 is set to 1.5 nm, for example.

Figure 8:
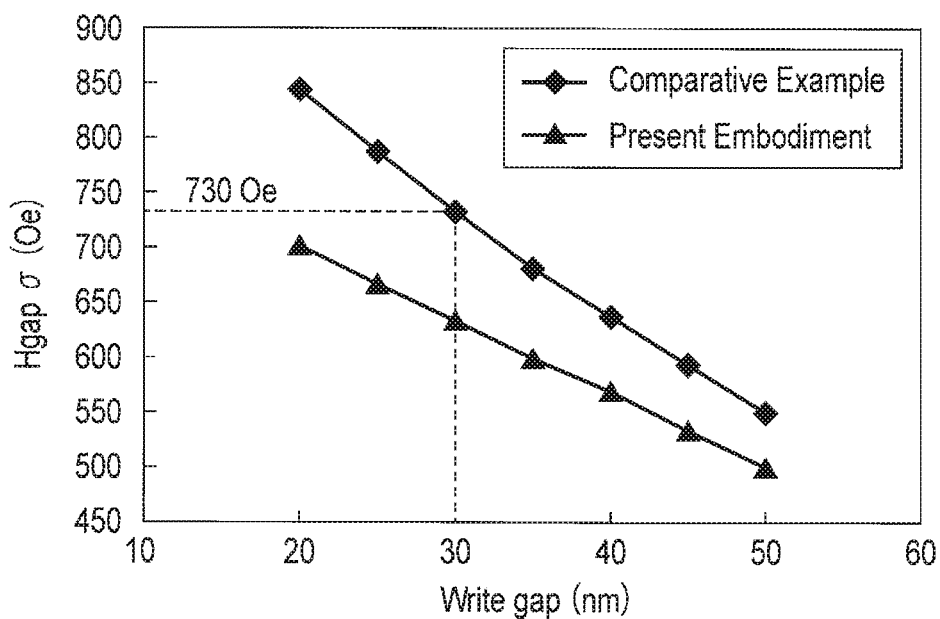
FIG. 8 is a diagram showing the relationship between the length of a write gap and the distribution value, δ, of the gap magnetic-field regarding the magnetic head of this embodiment and a magnetic head according to the comparative example.

FIG. 8 is a diagram showing the relationship between the length of the write gap WG and the magnetic-field dispersion value, δ, of the external magnetic field (gap magnetic field) applied to the STO 65 within an in-plane of the STO 65 regarding the magnetic head of this embodiment and a magnetic head according to the comparative example.

As can be seen from this figure, the dispersion value δ of the gap magnetic field increases as the length of the write gap WG is shortened. In the comparative example, the dispersion value δ exceeds 730 (Oe) for a write gap of 30 nm, which is less than an oscillation angle of rotation of 30 degree shown in FIG. 7. On the other hand, in the magnetic head of the embodiment, the dispersion value δ of the gap magnetic field does not exceed 730 (Oe) even in the region of a write gap WG of 30 nm or less. Therefore, in the magnetic head of the embodiment, the STO 65 oscillates excellently even in the region of a write gap length of 30 nm or less. Note that the interval (depth of the recess) rh of the STO 65 is set to 1.5 nm as an example.

Next, a proper range of the interval (depth of the recess) rh of the STO 65 with respect to the write gap WG will be described.

FIG. 9 shows the relationship between the interval (depth of the recess) rh of the STO 65 and the dispersion value δ of the gap magnetic field when the length of the write gap WG is varied as 20, 25, 30, 35, 40, 45 and 50 nm. From this figure, it is understood that the dispersion value of the gap magnetic field becomes larger as the write gap length becomes shorter, and further that the dispersion is suppressed to smaller, as the recess rh of the STO 65 becomes larger. Here, in order for the STO 65 to oscillate excellently as described above, it is desirable that the dispersion value δ of the gap magnetic field be 730 (Oe) or lower. Therefore, the interval rh of the STO 65 required for excellent oscillation can be drawn from FIG. 9 for each write gap length.

FIG. 10 shows the relationship between the length of the write gap WG and the required interval rh-min of the STO 65. From this figure, the followings can be understood. That is, when the write gap WG is about 35 nm or more, the dispersion value of the gap magnetic field is small and therefore the STO 65 need not be retreated. On the other hand, when the write gap WG is less than about 30 nm, it is necessary to retreat the STO 65 by a certain amount in order to suppress the dispersion value of the gap magnetic field to such a degree as for the STO 65 to oscillate excellently. Here, when the write gap length is less than about 30 nm, the relationship between the necessary minimum interval rh (min) and the write gap length can be expressed approximately by $$rh(\min) = -0.00407 \times Lwg2 + 0.0934 \times Lwg + 1.1 \quad (1),$$

where Lwg is the write gap length (nm).

Figure 11:
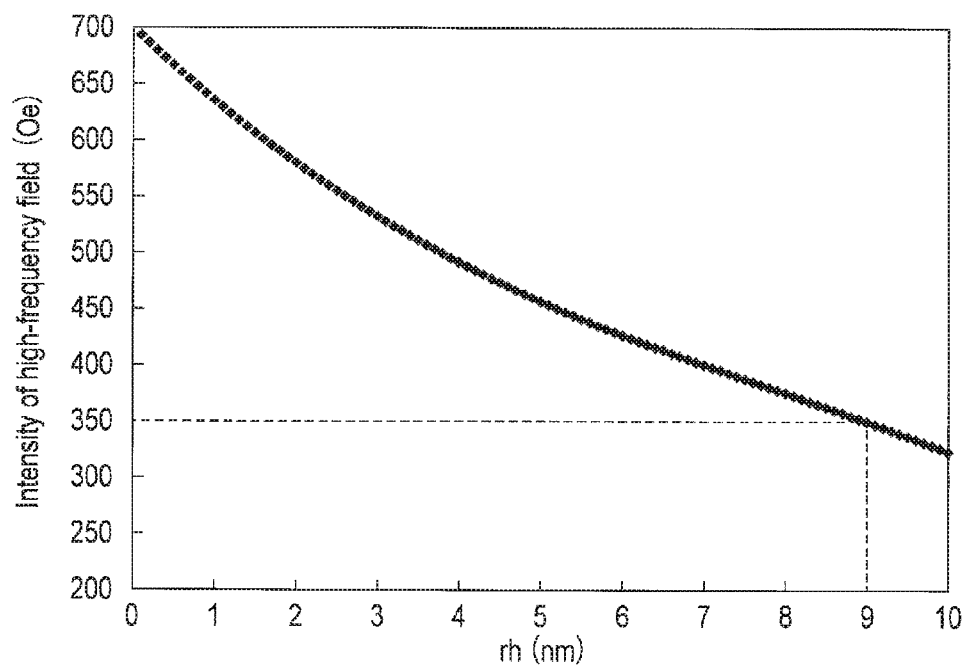
FIG. 11 is a diagram showing the relationship between the retreat amount rh of the STO and the intensity of the high-frequency magnetic field applied to the central portion of the magnetic recording layer in the thickness direction.

FIG. 11 shows the relationship between the high-frequency magnetic field intensity applied to the central portion of the magnetic recording layer 103 of the magnetic disk 16 in the thickness direction from the STO 65 and the interval rh of the STO 65 when the STO 65 oscillates ideally by an angle of rotation of 90 degrees. From this figure, it is understood that as the interval rh increases, the STO 65 and the magnetic recording layer 103 physically separate further distant from each other, and accordingly the high-frequency magnetic field intensity is also reduced. When the interval rh reaches 9 nm, the high-frequency magnetic field intensity becomes less than 350 (Oe) which is generally required for obtaining a clear assist effect in terms of index such as SN ratio or over-write. For this reason, the interval rh of the STO 65 should desirably be less than 9 nm. That is, the relationship:

$$\text{Allowable maximum interval } rh(\max) = 9 \text{ (nm)} \quad (2)$$

can be obtained.

From the Equations (1) and (2) provided above, the appropriate range of the interval rh of the STO 65 can be approximately expressed as follows:

$$(-0.00407 \times Lwg2 + 0.0934 \times Lwg + 1.1) < rh < 9 \quad (3)$$

By setting the interval rh to satisfy the Expression (3), it becomes possible for the STO 65 to excellently oscillate, thereby applying a stronger high-frequency magnetic field to the recording medium also in the magnetic head which has a short write gap WG of 30 nm or less with high linear recording density. That is, the degradation of the oscillation characteristics of the STO 65 can be suppressed, stable high-frequency assist recording can be realized, and higher recording density can be realized.

As described above, according to this embodiment, it is possible to provide a magnetic head which can perform stable high-frequency assist recording, which enables to realize high recording density and an HDD comprising such a magnetic head.

Next, an example of the method of manufacturing the magnetic head described above will be described.

Figure 12:
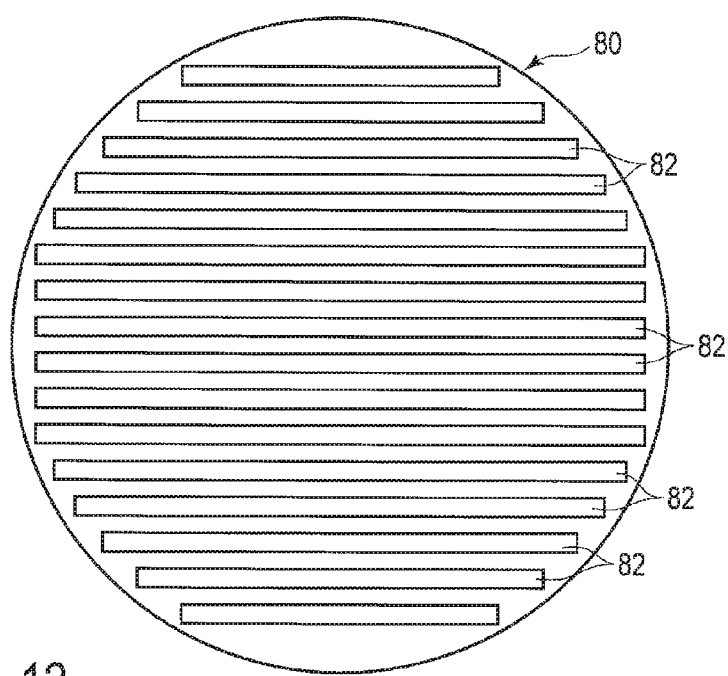
FIG. 12 is a plan view briefly showing a head wafer in which a number of magnetic heads are formed in a manufacturing method according to a first embodiment.
Figure 13:
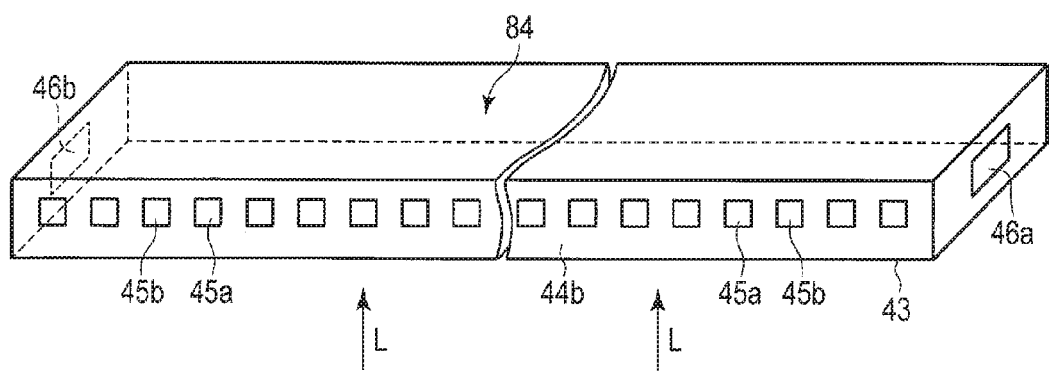
FIG. 13 is an expanded perspective view showing a rod-shaped piece (row bar) cut out from the head wafer.
Figure 14:
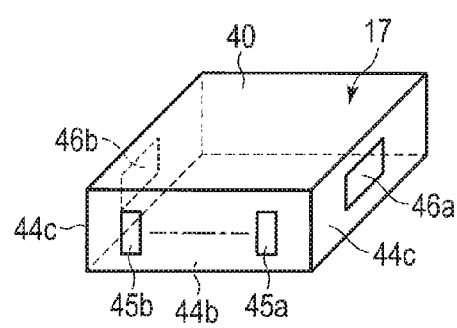
FIG. 14 is a perspective view briefly showing one magnetic head cut from the row bar.

FIG. 12 is a plan view of a head wafer in which a large number of magnetic heads are formed from a thin stack film. FIG. 13 is an enlarged perspective view of a rod-shaped piece (row bar) cut from the head wafer. FIG. 14 is a perspective view briefly showing one magnetic head cut from the row bar. FIG. 15 is a view briefly showing an internal structure of the row bar.

As shown in FIG. 12, in the manufacturing process of the magnetic head 17, a large number of magnetic heads 17 each including a slider, a read head and a recording head including an STO, are formed by process of stacking thin-films to be arranged consecutively on a head wafer 80, thus forming a plurality of head aggregate rows 82. Each magnetic head in the head aggregate rows 82 is configured to be similar to the magnetic head 17 of the first embodiment described above. Subsequently, as shown in FIG. 13, each head aggregate row 82 is cut from the head wafer 80, and a plurality of rod-shaped head aggregates (row bars) 84 each including a plurality of consecutive magnetic heads 17 are thus obtained. In each row bar 84, for example, sixty to seventy thin-film magnetic heads 17 are consecutively arranged in a line.

As shown in FIGS. 13 and 15, each row bar 84 comprises the connection terminals 46a and 46b exclusively for processing, formed at both longitudinal end surfaces thereof. Further, the connection terminals 46a and 46b are formed between each adjacent pair of magnetic heads 17. The connection terminals 46a and 46b are serially connected and also electrically connected to the main pole 60 and the trailing shield 62 of each magnetic head 17. Further, the connection terminals 46a and 46b are electrically connected to the contact pads 45a and 45b. With this structure, the connection terminals 46a and 46b of a plurality of magnetic heads 17, the main pole 60 and the trailing shield 62 are connected in series to be electrically continuous at the same time.

Note that in FIG. 13 or FIG. 15, an illustration of contact pads 45 for elements other than the STO 65, wrapping guide or the like is omitted.

Subsequently, as shown in FIGS. 13 and 15, a bottom surface of the row bar 84 (surface serving as the ABS 43 of the magnetic head 17) is polished (lapping) in a polishing direction L. Here, voltage or current is applied from a power supply 86 to the connection terminals 46a and 46b provided on both longitudinal end surfaces of the row bar 84. Thus, voltage or current is applied to the main pole 60, the STO 65 and the trailing shield 62 of each of magnetic heads 17 in series. The voltage or current applied during polishing is set slightly higher than that applied to the STO 65 for driving the magnetic head in a normal operation. When voltage or current is applied as described above, the STO 65 of each magnetic head 17 thermally expands slightly in a direction projecting from the ABS.

Then, while the STO 65 is expanded, the ABS 43 is polished according to the lapping guide until the ABS 43 has a desired shape and height (lapping). After polishing (lapping), when the voltage or current being applied to the connection terminals 46a and 46b is cut, each STO 65 is formed into such a shape that it retreats from the ABS 43 by the portion which expanded. Note that the interval rh of the STO 65 can be adjusted by the magnitude of the voltage or current applied to the connection terminals 46a and 46b during the polishing of the ABS.

After the polishing, a number of magnetic heads 17 as shown in FIG. 14 are cut from the row bar 84. On both side surfaces 44c of each magnetic head 17 cut out, the connection terminals 46a and 46b are exposed.

According to the method of manufacturing the magnetic head having the above-described structure, electricity is supplied to the STOs of a plurality of magnetic heads simultaneously to be expanded, and further, these magnetic heads including the STOs can be polished simultaneously (lapping). In this manner, it is possible to manufacture a magnetic head with a lower end surface of its STO recessed in the direction away from the ABS easily and inexpensively.

Note that the first embodiment described above involves such a manufacturing process that polishing is carried out while the STOs are expanded by the electricity being applied to the STOs of a number of magnetic heads in series. But the manufacturing process is not limited to this. The processing (e.g. lapping or polishing) may be carried out while electricity is being supplied to the recording coils of the magnetic heads or the heater.

Figure 16:
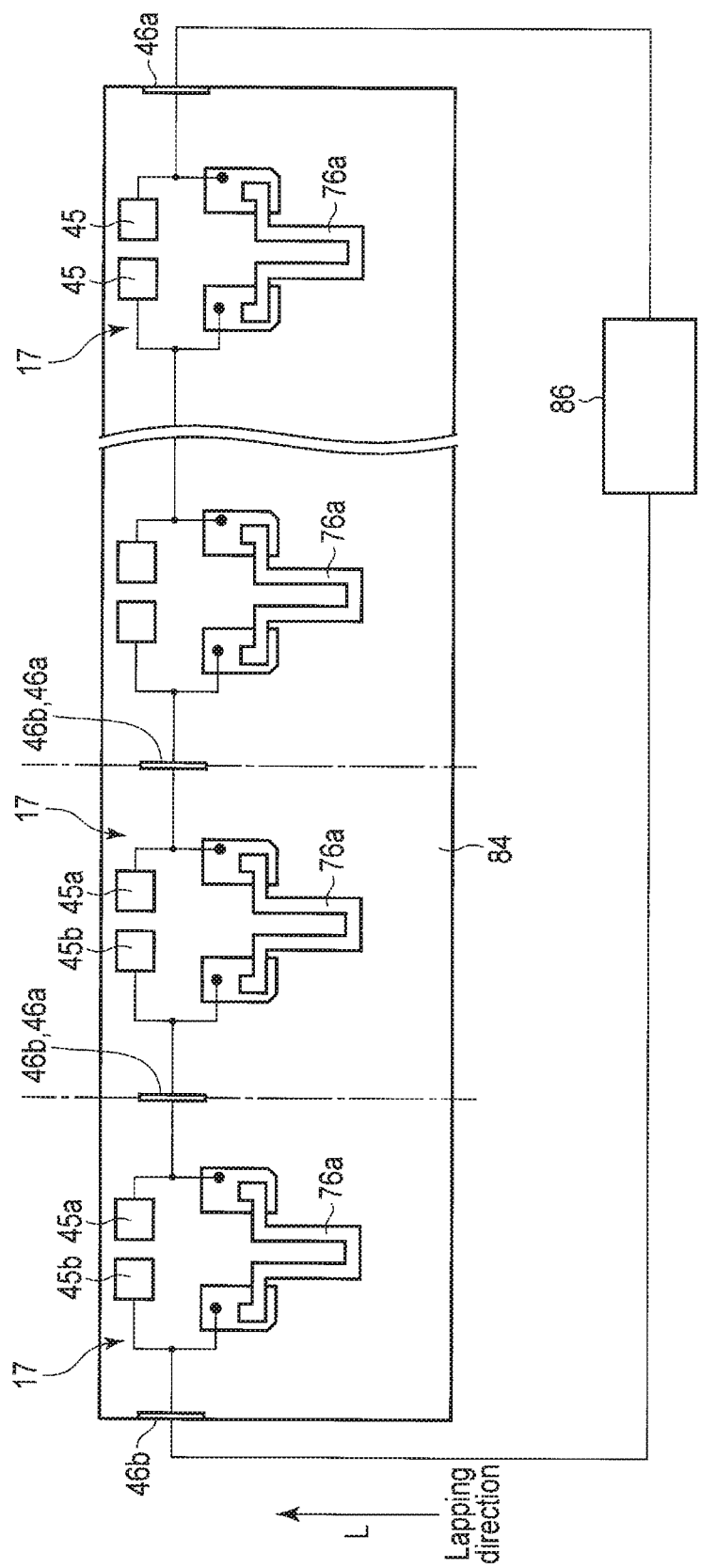
FIG. 16 is a diagram briefly showing an internal structure of a row bar according to a first modification.

FIG. 16 is a diagram briefly showing the internal structure of a row bar according to a first modification. According to the first modification, connection terminals 46a and 46b exclusively for processing are formed on both longitudinal end surfaces of the row bar 84. Connection terminals 46a and 46b are formed between each adjacent pair of magnetic heads 17. These connection terminals 46a and 46b are electrically connected in series and also connected to first heaters 76a of the magnetic heads 17, respectively. Further, the connection terminals 46a and 46b and the first heaters 76a are electrically connected to the contact pads 45a and 45b. Thus, the connection terminals 46a and 46b and the first heaters 76a of the magnetic heads 17 are connected in series to be electrically continuous simultaneously.

In order to polish (lap) the ABS of the row bar 84 in the polishing direction L, voltage or current is applied from the power supply 86 to the connection terminals 46a and 46b provided on both longitudinal end surfaces of the row bar 84.

Thus, voltage or current is applied to a plurality of first heaters 76a in series. The voltage or current applied is set slightly higher than that applied to the first heaters 76a during driving of the magnetic head in a normal operation. When the first heaters 76a produce heat, each magnetic head 17 including the STO 65 thermally expands slightly in a direction projecting from the ABS.

Then, while the STO 65 is expanded, the ABS 43 is polished (lapping) according to the lapping guide until the ABS 43 has a desired shape and height. After polishing, when the voltage or current is cut, each STO 65 is formed into such a shape that it retreats from the ABS 43 by the portion which expanded. Note that the processing of the row bar 84 while the first heaters 76a are on is not limited to the polishing, but may be other processing.

Figure 17:
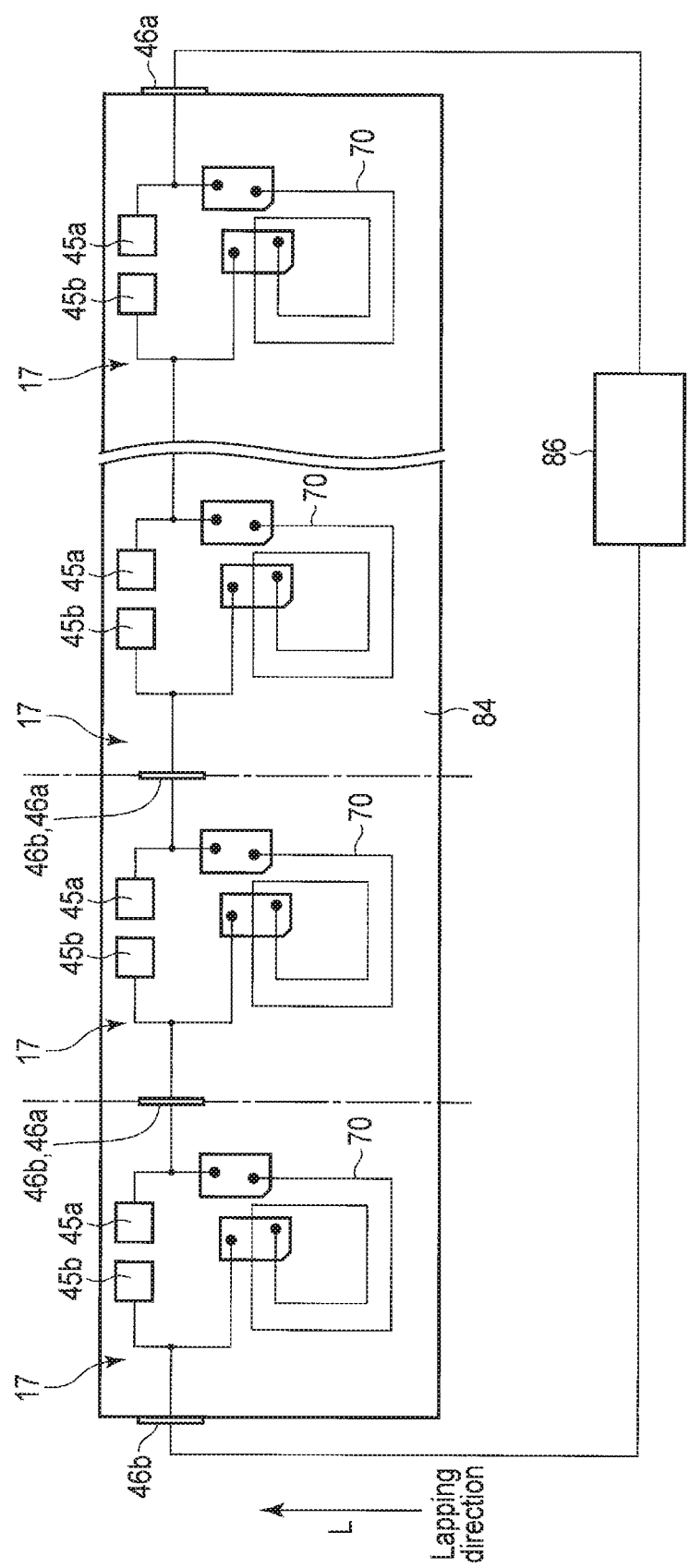
FIG. 17 is a diagram briefly showing an internal structure of a row bar according to a second modification.

FIG. 17 is a diagram briefly showing the internal structure of a row bar according to the second modification. According to the second modification, connection terminals 46a and 46b exclusively for processing are formed on both longitudinal end surfaces of the row bar 84. Connection terminals 46a and 46b are formed between each adjacent pair of magnetic heads 17. These connection terminals 46a and 46b are connected in series and also electrically connected to first coils 76 of the magnetic heads 17, respectively. Further, the connection terminals 46a and 46b and the first coil 70 are electrically connected to the contact pads 45a and 45b. Thus, the connection terminals 46a and 46b and the first coil 70 of the magnetic heads 17 are connected in series to be electrically continuous simultaneously.

In order to polish (lap) the ABS of the row bar 84 in the polishing direction L, voltage or current is applied from the power supply 86 to the connection terminals 46a and 46b provided on both longitudinal end surfaces of the row bar 84. Thus, voltage or current is applied to a plurality of first coils 70 in series. The voltage or current applied is set slightly higher than that applied to the first coils 70 during driving of the magnetic head in a normal operation. When power is supplied thereto, the first coils 70 produce heat and each magnetic head 17 including the STO 65 thermally expands slightly in a direction projecting from the ABS.

Then, while the STO 65 is expanded, the ABS 43 is polished according to the lapping guide until the ABS 43 has a desired shape and height (lapping). After polishing, when the voltage or current being applied to the connection terminals 46a and 46b is cut, each STO 65 is formed into such a shape that it retreats from the ABS 43 by the portion which expanded. Note that the processing of the row bar 84 while power is being supplied to the first coils 70 is not limited to the polishing, but may be other processing.

According to the method of manufacturing the magnetic head according to the first modification or second modification, electricity is supplied to the STOs of a plurality of magnetic heads simultaneously to be expanded, and further, these magnetic heads including the STOs can be polished simultaneously (lapping). In this manner, it is possible to manufacture a magnetic head with a lower end surface of its STO recessed in the direction away from the ABS easily and inexpensively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the material, shape, size and the like of each element of the head portion can be replaced when needed. Further, in the magnetic disk drive, the number of magnetic disks or magnetic heads may be increased when needed, and also the size of each magnetic disk can be varied. Furthermore, the spin torque oscillator may be provided not only on the trailing side of the main pole but on the leading side of the main pole.

What is claimed is:

1. A magnetic head assembly comprising:
    a slider comprising an air bearing surface, a first surface crossing the air bearing surface, and a second surface crossing the air bearing surface;
    a main pole in the slider, configured to produce a magnetic field for recording and comprising a distal end portion extending to the air bearing surface;
    a write shield in the slider, opposing the distal end portion of the main pole with a write gap therebetween;
    a high-frequency oscillator provided between the main pole and the write shield within the write gap and electrically connected to the main pole and the write shield, the high-frequency oscillator comprising a spin injection layer and an oscillation layer stacked one on another, and at least the oscillation layer being recessed in a direction away from the air bearing surface with respect to the main pole and the write shield;
    a contact pad provided on the first surface and electrically connected to the high-frequency oscillator; and
    a connection terminal provided on the second surface and electrically connected to the high-frequency oscillator to supply electricity to the high-frequency oscillator,
    wherein the write gap is formed to be 30 nm or less, and the oscillation layer is recessed by 1 nm or more; and where a length of the write gap is represented by Lwg (nm) and a depth of recess of the oscillation layer from the air bearing surface is represented by rh (nm), the depth rh satisfies a relationship:

$$(-0.00407 \times Lwg2 + 0.0934 \times Lwg + 1.1) < rh < 9.$$

2. The magnetic head assembly of claim 1, wherein the connection terminal is electrically connected to the high-frequency oscillator through the main pole and the write shield.

3. The magnetic head assembly of claim 1, further comprising a heater configured to heat vicinities of the main pole and the write shield, and electrically connected to the connection terminal.

4. The magnetic head assembly of claim 1, further comprising a coil around a magnetic core including the main pole and the write shield and electrically connected to the connection terminal.

5. A disk drive comprising:
a disk-shaped recording medium comprising a magnetic recording layer; and
a magnetic head assembly configured to record data on the recording medium, the magnetic head assembly comprising:
a slider comprising an air bearing surface, a first surface crossing the air bearing surface, and a second surface crossing the air bearing surface;
a main pole in the slider, configured to produce a magnetic field for recording and comprising a distal end portion extending to the air bearing surface;
a write shield in the slider, opposing the distal end portion of the main pole with a write gap therebetween;
a high-frequency oscillator provided between the main pole and the write shield within the write gap and electrically connected to the main pole and the write shield, the high-frequency oscillator comprising a spin injection layer and an oscillation layer stacked one on another, and at least the oscillation layer being recessed in a direction away from the air bearing surface with respect to the main pole and the write shield;
a contact pad provided on the first surface and electrically connected to the high-frequency oscillator; and
a connection terminal provided on the second surface and electrically connected to the high-frequency oscillator to supply electricity to the high-frequency oscillator;
wherein the write gap is formed to be 30 nm or less, and the oscillation layer is recessed by 1 nm or more; and
wherein a length of the write gap is represented by Lwg (nm) and a depth of recess of the oscillation layer from the air bearing surface is represented by rh (nm), the depth rh satisfies a relationship:

$$(-0.00407 \times Lwg2 + 0.0934 \times Lwg + 1.1) < rh < 9.$$

6. The disk drive of claim 5, wherein the connection terminal is electrically connected to the high-frequency oscillator through the main pole and the write shield.

* * * * *